Nov. 17, 1970  H. DIAMOND ET AL  3,540,278

MOISTURE SENSOR

Filed Sept. 4, 1968

INVENTORS.
HOWARD DIAMOND
ROBERT T. EGGLESTON
ROGER H. BADERTSCHER
DAVID W. PLETCHER

BY *Hofgren, Wegner, Allen, Stellman & McCord.*

ATTORNEYS.

United States Patent Office 3,540,278
Patented Nov. 17, 1970

3,540,278
MOISTURE SENSOR
Howard Diamond, Robert T. Eggleston, and Roger H. Badertscher, Ann Arbor, and David W. Pletcher, Chelsea, Mich., assignors to Whirlpool Corporation, a corporation of Delaware
Filed Sept. 4, 1968, Ser. No. 780,922
Int. Cl. G01n 27/30
U.S. Cl. 73—336.5            3 Claims

ABSTRACT OF THE DISCLOSURE

A moisture sensor generating an electric current when exposed and subjected to moisture comprising an electrically insulating substrate having a surface that is exposed to moisture when in use and a pair of spaced electrically conducting metal electrodes mounted on this exposed surface for simultaneous contact with the moisture so that the electrodes generate an electric current proportional to the amount of moisture present.

---

One of the features of this invention is to provide a moisture sensor and indicating device of an improved construction in which a surface of an electrically insulating substrate is arranged for exposure to a moisture containing environment with this surface carrying a pair of spaced metal electrodes for simultaneous contact with the moisture and thereby operating as a voltaic cell to generate an electric current.

Other features and advantages of the invention will be apparent from the following description of the invention taken in conjunction with the accompanying drawings illustrating two embodiments of the invention. Of the drawings.

Figure 1:
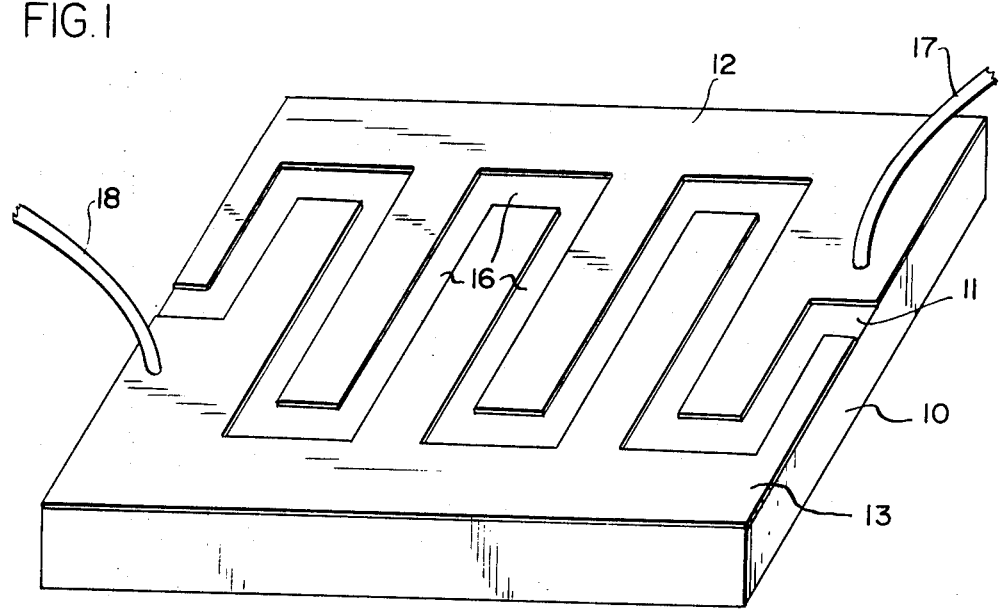
FIG. 1 is a perspective view illustrating a first embodiment of the invention.

The voltaic cell sensor and indicator device of this invention as illustrated in the two embodiments includes a substrate 10 in the embodiment of FIG. 1 that is electrically insulating and which may be a ceramic. This substrate has a surface 11 that is adapted to be exposed to a moisture containing environment such as the interior atmosphere of a clothes dryer (not shown). This surface 11 carries a pair of spaced electrodes 12 and 13 that are electrically conducting and that are preferably made of metal or metal alloys. The two electrodes 12 and 13 are deposited on the surface 11 in spaced relationship in any manner desired such as by the use of ordinary deposition techniques of which vapor deposition is an excellent example.

The substrate 10 is preferably hygroscopic. When in contact with the moisture containing environment such as the dryer atmosphere the device has a fast moisture absorption rate and a slow desorption rate. This means that the voltage is generated rapidly to give an immediate indication of moisture content.

Figure 2:
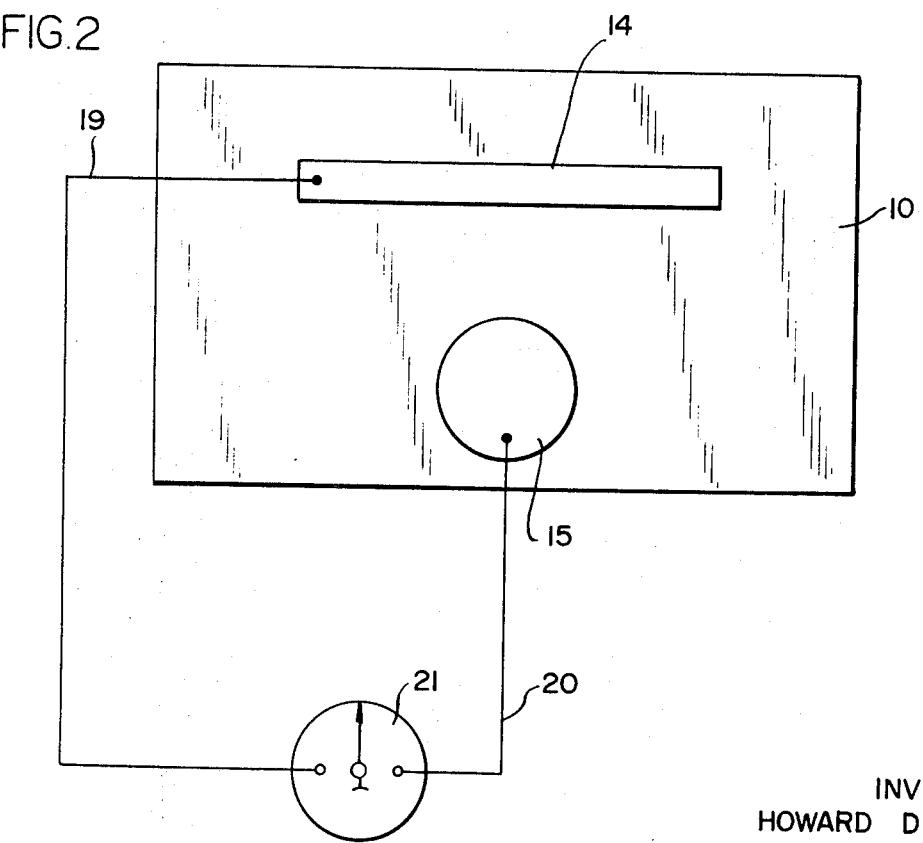
FIG. 2 is a plan view illustrating a second embodiment and also including an electric circuit with a voltage indicating device of the type also usable in the FIG. 1 embodiment.

Typical materials for making the substrate 10 include alumina, cerium oxide and lead, barium and strontium titanates. The electrodes 12 and 13 are metallic of which aluminum, gold, nickel, chromium, magnesium and platinum are good examples. In the embodiment as illustrated in FIG. 1 (where the electrode 12 is aluminum and the electrode 13 is chromium), the metals in the two electrodes are different in order that an electric current will be generated. In the embodiment of FIG. 2 the electrodes 14 and 15 on the substrate 10 are of different geometrics or shapes to have different peripheral lengths. They may be of the same metal, such as magnesium, if desired. It is necessary that the geometrics differ to generate an electric current although the actual surface areas of the electrodes may be the same, if desired. This is the case in FIG. 2. In general, the greater the difference in peripheral length the larger the generated current.

As stated earlier, the electrodes 12–15 may be deposited on the surface 11 by any method desired such as by vapor deposition. They will ordinarily be quite thin with typical thicknesses being of the order of about 1 to 100 microns. FIG. 1 illustrates the thickness of the electrodes 12 and 13 in greatly exaggerated form for clarity of illustration.

In the embodiment illustrated in FIG. 1 the pairs of electrodes are interdigitated so that the spacing 16 between electrodes forms a tortuous path. The reason for this is that the internal resistance of the device is inversely proportional to the length of the spacing 16 path. To obtain a low internal resistance a long path or electrode length is used. In a preferred embodiment this spacing 16 may vary from about 0.05 to 0.4 inch.

In order to indicate the amount of electricity generated and thus the degree of moisture present in the environment contacting the electrodes (12 and 13) and the insulating surface 11 each electrode is provided with a lead 17 and 18 as shown in the FIG. 1 embodiment and 19 and 20 in the FIG. 2 embodiment. As illustrated in FIG. 2, these electrodes form a part of an electric circuit which also includes a voltage indicating device 21 such as a galvanometer.

As an example of a cell using aluminum and gold electrodes, the following chemical reaction can be postulated:

the aluminum is oxidized according to the following reaction:

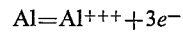

with an electrode potential of 1.70 volts under standard conditions. The gold electrode as an inert metal serves as an electrical contact for the following reduction reaction:

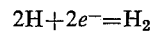

The substrate material is preferably somewhat porous and hygroscopic so that moisture will be quickly absorbed and slowly given off. The cell will then give an average reading if rapidly varying moisture conditions are encountered. This situation may arise in a clothes dryer where different parts of the clothing having differing moisture retention levels contact the moisture sensor.

Having described our invention as related to the embodiments shown in the accompanying drawings, it is our intention that the invention be not limited by any of the details of description, unless otherwise specified.

The embodiments of the invention in which an exclusive property or privilege is claimed are defined as follows:

1. A moisture sensor generating an electric current when subjected to moisture, comprising: an electrically insulating substrate having a surface exposed to said moisture; a pair of spaced electrically conducting metal electrodes mounted on said surface for simultaneous contact with said moisture wherein the metals of the two electrodes are different, the electrodes thereby generating an electric current proportional to the amount of moisture present.

2. The device of claim 1 wherein said substrate surface is porous and hygroscopic.

3. The device of claim 2 wherein said substrate is a ceramic.

References Cited

UNITED STATES PATENTS

| | | | |
|---|---|---|---|
| 2,681,571 | 6/1954 | Becker | 73—336.5 |
| 2,862,090 | 11/1958 | Mayer | 338—35 |

LOUIS R. PRINCE, Primary Examiner

D. E. CORR, Assistant Examiner